United States Patent
Chakravarti et al.

(10) Patent No.: US 10,747,770 B2
(45) Date of Patent: *Aug. 18, 2020

(54) CONTINUOUS AUGMENTATION METHOD FOR RANKING COMPONENTS IN INFORMATION RETRIEVAL

(71) Applicant: INTERNATIONAL BUSINESS MACHINES CORPORATION, Armonk, NY (US)

(72) Inventors: Rishav Chakravarti, Mount Vernon, NY (US); Jiri Navratil, Cortlandt Manor, NY (US); Bowen Zhou, Somers, NY (US)

(73) Assignee: Internationa Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/840,726

(22) Filed: Dec. 13, 2017

(65) Prior Publication Data
US 2019/0057095 A1    Feb. 21, 2019

Related U.S. Application Data

(63) Continuation of application No. 15/678,163, filed on Aug. 16, 2017.

(51) Int. Cl.
*G06F 16/2457* (2019.01)
*G06N 5/02* (2006.01)
(Continued)

(52) U.S. Cl.
CPC .... *G06F 16/24578* (2019.01); *G06F 16/3326* (2019.01); *G06N 5/022* (2013.01); *G06N 20/00* (2019.01)

(58) Field of Classification Search
USPC .......................... 707/706, 723, 728
See application file for complete search history.

(56) References Cited

U.S. PATENT DOCUMENTS 9,092,510 B1  7/2015  Stets, Jr. et al.
9,342,908 B2  5/2016  Hirsch et al.
(Continued)

OTHER PUBLICATIONS

Chakravarti, et al., "Continuous Augmentation Method for Ranking Components in Information Retrieval", U.S. Appl. No. 15/678,163, filed Aug. 16, 2017.

(Continued)

*Primary Examiner* — Hung T Vy
(74) *Attorney, Agent, or Firm* — Robert D. Bean (57) ABSTRACT

According to one embodiment, a method, computer system, and computer program product for continuously ranking components in a live information is provided. The present embodiment may include receiving search feedback derived from interactions between users and information retrieval systems; assigning weights to each of the ranking components; adjusting the assigned weights based on search feedback; modifying the current set of ranking components based on the search feedback by adding new ranking components and deleting old ranking components; transmitting a query from the users to the current set of ranking components; aggregating ranking results from the transmitted query into a single ranking based on the weights; and transmitting the single ranking to the users.

7 Claims, 5 Drawing Sheets

(51) Int. Cl.
*G06N 20/00* (2019.01)
*G06F 16/332* (2019.01)

(56) References Cited

U.S. PATENT DOCUMENTS

| | | | | |
|---|---|---|---|---|
| 9,535,995 | B2* | 1/2017 | Bennett | G06F 16/951 |
| 2007/0239702 | A1* | 10/2007 | Vassilvitskii | G06F 16/951 |
| 2010/0082582 | A1* | 4/2010 | Gao | G06F 16/9535 707/706 |
| 2010/0250523 | A1* | 9/2010 | Jin | G06F 16/951 707/723 |
| 2014/0067783 | A1* | 3/2014 | Awadallah | G06F 16/3331 707/706 |
| 2017/0124078 | A1* | 5/2017 | Malik | G06F 16/951 |

OTHER PUBLICATIONS

List of IBM Patents or Patent Applications Treated as Related. Filed Dec. 13, 2017. 2 pages.
Mell et al., "The NIST Definition of Cloud Computing," National Institute of Standards and Technology, Sep. 2011, p. 1-3, Special Publication 800-145.
Can et al., "Incorporating Query-Specific Feedback into Learning-to-Rank Models", Published in Proceeding SIGIR '14 Proceedings of the 37th International ACM SIGIR Conference on Research & Development in Information Retrieval, pp. 1035-1038, Gold Coast, Queensland, Australia, Jul. 6-11, 2014.
Radlinski et al., "How Does Clickthrough Data Reflect Retrieval Quality?", Published in Proceeding CIKM '08 Proceedings of the 17th ACM Conference on Information and Knowledge Management, pp. 43-52, Napa Valley, California, USA, Oct. 26-30, 2008.
Hofmann et al., "Balancing Exploration and Exploitation in Learning to Rank Online", Published in Proceeding ECIR'11 Proceedings of the 33rd European Conference on Advances in Information Retrieval, pp. 251-263, Dublin, Ireland, Apr. 18-21, 2011.
Li et al., "ReQ-ReC: High Recall Retrieval with Query Pooling and Interactive Classification", Published in Proceeding SIGIR '14 Proceedings of the 37th international ACM SIGIR conference on Research & Development in Information Retrieval, pp. 163-172, Gold Coast, Queensland, Australia, Jul. 6-11, 2014.
Calumby et al., "On interactive learning-to-rank for IR: Overview, recent advances, challenges, and directions", Neurocomputing, vol. 208, Oct. 5, 2016, pp. 1-22.
Cortes et al., "Sample Selection Bias Correction Theory", Published in Proceeding ALT '08 Proceedings of the 19th International Conference on Algorithmic Learning Theory, pp. 38-53, Budapest, Hungary, Oct. 12-16, 2008.
Sheldon et al., "LambdaMerge: Merging the Results of Query Reformulations", Published in Proceeding WSDM '11 Proceedings of the Fourth ACM International Conference on Web Search and Data Mining, pp. 795-804, Hong Kong, China, Feb. 9-12, 2011.
Radlinski et al., "Minimally Invasive Randomization for Collecting Unbiased Preferences from Clickthrough Logs", Published in Proceeding AAAI'06 Proceedings of the 21st National Conference on Artificial intelligence, vol. 2, pp. 1406-1412, Boston, Massachusetts, Jul. 16-20, 2006.
Asadi et al., "Pseudo Test Collections for Learning Web Search Ranking Functions", Published in Proceeding SIGIR 11 Proceedings of the 34th International ACM SIGIR Conference on Research and Development in Information Retrieval, pp. 1073-1082, Beijing, China, Jul. 24-28, 2011.
Joachims et al., "Accurately Interpreting Clickthrough Data as Implicit Feedback", Published in Proceeding SIGIR '05 Proceedings of the 28th Annual International ACM SIGIR Conference on Research and Development in Information Retrieval, pp. 154-161, Salvador, Brazil, Aug. 15-19, 2005.
Ustinovskiy et al., "An Optimization Framework for Weighting Implicit Relevance Labels for Personalized Web Search", Published in Proceeding WWW '15 Proceedings of the 24th International Conference on World Wide Web, pp. 1144-1154, Florence, Italy, May 18-22, 2015.
Wang et al., "Learning to Rank with Selection Bias in Personal Search", Proceedings of the 39th International ACM SIGIR Conference on Research and Development in Information Retrieval, ACM, 2016, pp. 115-124, Pisa, Italy, Jul. 17-21, 2016.
Agbele et al., "Algorithm for Information Retrieval Optimization", World Academy of Science, Engineering and Technology, International Journal of Computer, Electrical, Automation, Control and Information Engineering vol. 10, No. 9, 2016, pp. 1604-1610.
Cummins et al., "Evolving General Term-Weighting Schemes for Information Retrieval: Tests on Larger Collections", Department of Information Technology, National University of Ireland, Galway, Ireland, Artificial Intelligence Review, 2005, vol. 24, pp. 277-299.
Stojanovic et al., "Usage-Oriented Evolution of Ontology-Based Knowledge Management Systems", CoopIS/DOA/ODBASE 2002, LNCS 2519, 2002, pp. 1186-1204.

* cited by examiner

CONTINUOUS AUGMENTATION METHOD FOR RANKING COMPONENTS IN INFORMATION RETRIEVAL

BACKGROUND

The present invention relates, generally, to the field of computing, and more particularly to the field of information retrieval.

Information retrieval (IR) concerns fetching information resources from a data repository in response to a query. Information to be retrieved may take many forms, such as a document, information within the document, metadata that describes data, texts, images, or sounds. With the advent of computer networks, cloud computing, and the internet, information retrieval has become a crucial component of business and of personal life. Many universities and public libraries use IR systems to access books, journals, and other documents; businesses and museums use IR systems to access inventory, and individuals use IR systems to access the internet, to name but a few examples. Most IR systems assign a score to each object in the database to be searched, based on how well each object matches the query, and thereby ranks the objects by relevance. The top rankings are then shown to the user, and this process may be iterated if the user chooses to refine the query.

SUMMARY

According to one embodiment, a method, computer system, and computer program product for continuously ranking components in a live information is provided. The present embodiment may include receiving search feedback derived from interactions between users and information retrieval systems; assigning weights to each of the ranking components; adjusting the assigned weights based on search feedback; modifying the current set of ranking components based on the search feedback by adding new ranking components and deleting old ranking components; transmitting a query from the users to the current set of ranking components; aggregating ranking results from the transmitted query into a single ranking based on the weights; and transmitting the single ranking to the users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the field of information retrieval (IR). The following described exemplary embodiments provide a system, method, and program product to, among other things, provide continuous and automated improvement of a ranking component in a live IR system. Therefore, the present embodiment has the capacity to improve the technical field of IR by allowing the management of a ranking component that can start with no training data and progressively incorporates both explicit and implicit feedback in a statistically rigorous fashion to optimize ranking performance.

As previously described, information retrieval (IR) is the field concerned with fetching information resources from a data repository in response to a query. Information to be retrieved may take many forms, such as information in a document, the document itself, metadata that describes data, texts, images, or sounds. With the advent of computer networks, cloud computing, and the internet, information retrieval has become a crucial component of business and of personal life. Many universities and public libraries use IR systems to access books, journals, and other documents; businesses and museums use IR systems to access inventory, and individuals use IR systems to access the internet, to name but a few examples. Most IR systems assign a score to each object in the database to be searched, based on how well each object matches the query, and thereby ranks the objects by relevance. The top rankings are then shown to the user, and this process may be iterated if the user chooses to refine the query.

One example of a ranking system is the learning-to-rank algorithm, which applies machine learning to the creation of ranking models. Learning-to-rank algorithms traditionally rely on an initial explicitly annotated training data set based on which ranking models are created. Given a user and a query in a 'session', many schemes exist to iteratively improve upon the ranking order derived from this model using implicit interactions (i.e. clicks or downloads) in the search session. In these methods, however, none of the optimization efforts or accumulated knowledge are preserved after the session, meaning future sessions cannot benefit from prior sessions. Online learning-to-rank algorithms are beginning to apply these iterative improvement approaches so that implicit feedback gained from a search session can be used to improve model performance on future sessions. One such algorithm uses modifications of the rank interleaving technique used for evaluating two different ranking models in a live usage setting. However, the interleaving mechanism is primarily used to manage exploration versus exploitation trade-offs, and the outcomes from the online evaluation are not incorporated into an end-to-end lifecycle for improving and maintaining ranker performance over time. As such, it may be advantageous to, among other things, implement a system that incorporates feedback in real time in order to improve and maintain ranker performance, and prevent loss of accumulated knowledge and improvements.

According to one embodiment, the invention is a continuously optimized ranking method, performed within a live IR system, where candidate answers are ordered by an ensemble of ranking components; some of which are trainable, while others are fixed. The number of underlying ranking components varies as the IR system progresses through each stage of the life cycle. This is due to more use case specific data becoming available at each subsequent stage as a result of logged interactions between the IR system and the end users. The constant stream of data allows for adding more sophisticated ranking models at each stage, and re-determining the utility of existing components and adjusting their influence on the final ranking order accordingly. The various components in the ensemble are initialized with default weights which control the impact of each component on the overall ranking. However, these weights are automatically updated based on periodic measurements derived from implicit feedback collected from live interactions between users and the IR system. As a result, over time, the weights are tuned to prefer ranking components which yield rankings that are in line with actual and current user needs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to order candidate answers in a live IR system through an ensemble of ranking components, both trainable and fixed, to provide a continuously optimized ranking for the IR system.

Figure 1:
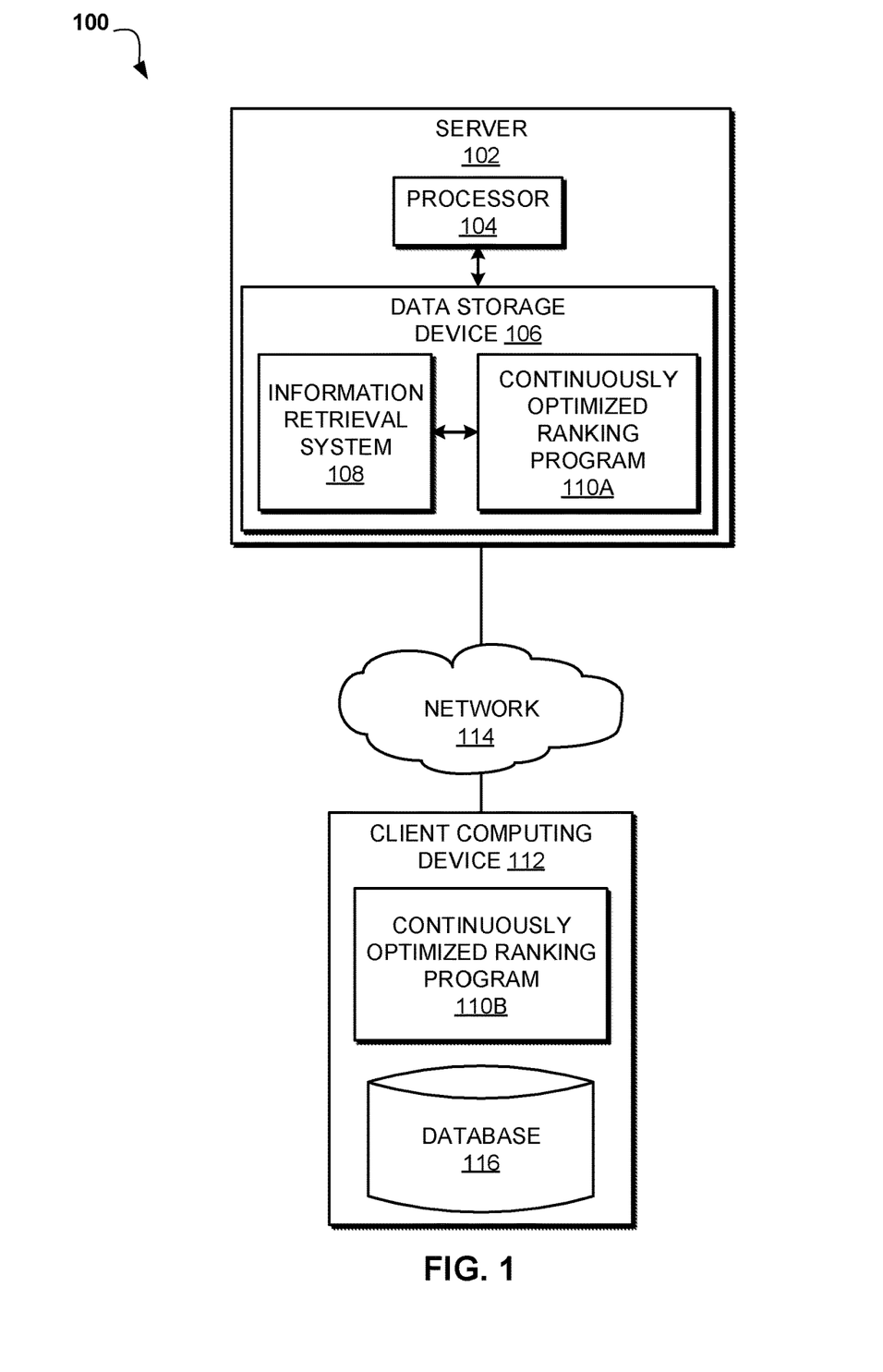
FIG. 1 illustrates an exemplary networked computer environment according to at least one embodiment.

Referring to FIG. 1, an exemplary networked computer environment 100 is depicted, according to at least one embodiment. The networked computer environment 100 may include server 102 and a client computing device 112 interconnected via a communication network 114. According to at least one implementation, the networked computer environment 100 may include a plurality of client computing devices 112 and servers 102, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 112 may be any device that is enabled to host and run a database 116 and a continuously optimized ranking program 110B and communicate with the server 102 via the communication network 114, in accordance with one embodiment of the invention. Client computing device 112 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 112 may include internal components 302a and external components 304a, respectively.

The server 102 may be a laptop computer, netbook computer, personal computer (PC), a desktop computer, or any programmable electronic device or any network of programmable electronic devices including a processor 104 and a data storage device 106, and being capable of hosting and running a continuously optimized ranking program 110A and an information retrieval system 108 and communicating with the client computing device 112 via the communication network 114, in accordance with embodiments of the invention. As will be discussed with reference to FIG. 3, the server 102 may include internal components 302b and external components 304b, respectively. The server 102 may also operate in a cloud computing service model, such as Software as a Service (SaaS), Platform as a Service (PaaS), or Infrastructure as a Service (IaaS). The server 102 may also be located in a cloud computing deployment model, such as a private cloud, community cloud, public cloud, or hybrid cloud.

Information retrieval system 108 may be one of any number of systems capable of searching a data repository, such as database 116, for information in response to a query, and which is in communication with continuously optimized ranking program 110A, 110B. Examples of information retrieval systems include search engines, such as Google® (Google and all Google-based trademarks and logos are trademarks or registered trademarks of Google, Inc. and/or its affiliates) and database management programs, such as MySQL® (MySQL and all MySQL-based trademarks and logos are trademarks or registered trademarks of MySQL AB Company and/or its affiliates). Although depicted on server 102, information retrieval system 108 may be located anywhere within networked computing environment 100, such as on client computing device 112 or any other computing device in communication with network 114. Any number of information retrieval systems 108 may be used with continuously optimized ranking program 110A, 110B.

According to the present embodiment, the continuously optimized ranking program 110A, 110B may be a program capable of providing continuous and automated improvement of a ranking component in a live information retrieval system 108 by progressively incorporating both explicit and implicit feedback in a statistically rigorous fashion to optimize ranking performance. The continuously optimized ranking method is explained in further detail below with respect to FIG. 2.

Figure 2:
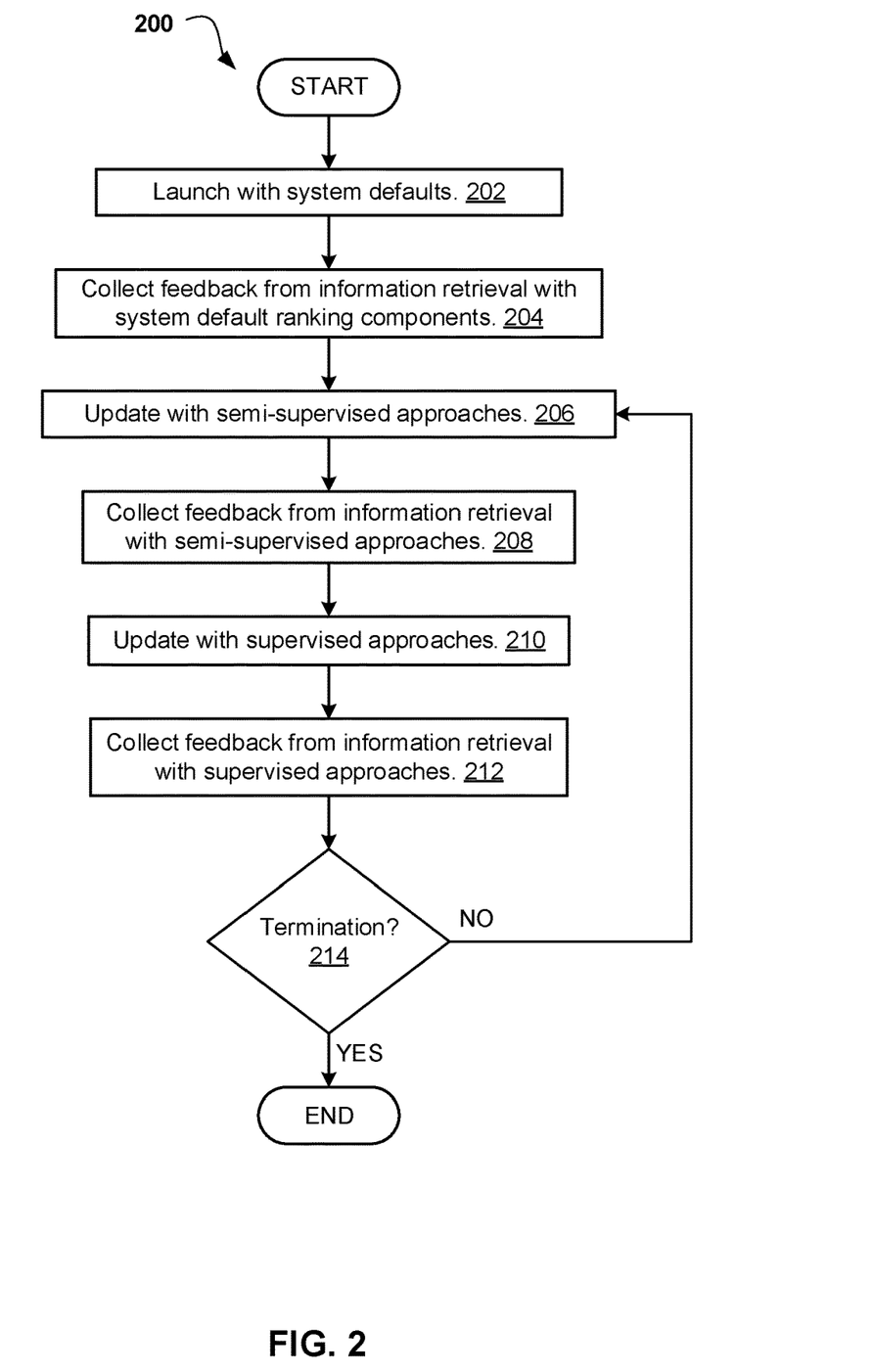
FIG. 2 is an operational flowchart illustrating a continuously optimized ranking process according to at least one embodiment.

Referring now to FIG. 2, an operational flowchart illustrating a continuously optimized ranking process 200 is depicted according to at least one embodiment. At 202, the continuously optimized ranking program 110A, 110B launches with system defaults. Optimized ranking program 110A, 110B may utilize a series of ranking components to provide search results for a user's query. Each ranking component may return a list of search results, each of which may be assigned a score that represents how relevant the ranking component considers the results to be. Each type of ranking component may use a different methodology and different feedback to produce its scores. At this stage, the IR system has recently been set up, and no usage logs are likely available for continuously optimized ranking program 110A, 110B to leverage in training a ranking component. Therefore, continuously optimized ranking program 110A, 110B may start with four ranking components that may operate using non-use-case-specific data, such as data provided from other related general use cases, or no data at all; examples of such ranking components include a ranking component that relies on base IR, a ranking component that is trained on pre-labelled (non-use-case specific data, a randomized ranking component, and a ranking component that is trained on expert-provided data for related general use cases.

The first exemplary ranking component is a ranking component which relies on base IR; this may be an extremely bare-bones ranking component which may perform no re-ranking or score calculation of its own, but merely returns to continuously optimized ranking program 110A, 110B outputs the ordering or score provided by an underlying IR system which is capable of supplying its own score or ranking the search results, such as Solr™ (Solr and all Solr-based trademarks and logos are trademarks or registered trademarks of the Apache Software Foundation and/or its affiliates). As such, this ranking component may not be reliant on feedback, which may make the component useful as an early-stage ranking component before feedback has been collected, but it may be superseded in accuracy by ranking components that are more heavily reliant on feedback.

The second exemplary ranking component is a ranking component that is trained on pre-labelled (non-use-case specific) data, chosen based on document match; this method assumes that the schema of the documents containing candidate answers follows a standardized format (i.e. each document is broken up into title, description, and body). The continuously optimized ranking program 110A, 110B may train the ranker using labelled examples from other domains (e.g., TREC data sets) and apply them to this use case. Sample selection bias techniques may be used to customize the training data from other domains so that the data matches the current use case as much as possible.

The third exemplary ranking component is a randomized ranking component. The randomized ranker may assign a score to search results based on training data to produce a ranking, and then may randomly swap search results to produce a ranking with a degree of randomness. This introduction of some randomness into the display order may allow for exploration to counteract some of the position biases that tend to impact click-based implicit feedback; because the randomized ranking component may produce random results that are unaffected by presentation bias, it may be used in establishing a baseline to compare other rankers against, for the purpose of isolating the effect of position bias. Efforts may be made to reduce the degree to which this randomized ranking component is able to disrupt the ranking order by restricting swaps to the top k results.

The fourth exemplary ranking component is a ranking component trained on expert-provided data for related general use cases. If experts are willing and able to create training data (for example, by guessing relevant queries and identifying relevant documents for those queries), then this additional ranking component may be used at this stage with training data derived completely from expert users with prior knowledge about the use case.

Continuously optimized ranking program 110A, 110B may use any number or combination of the aforementioned ranking components in step 202; however, continuously optimized ranking program 110A, 110B may be required to run with at least one randomized ranking component to collect unbiased data from usage, and to detect ranker deterioration and sub-optimal exploitation versus exploration trade-offs.

An ensembling approach may be used for each search query to combine the output of all ranking components into a single result, which may be presented to the user in response to the user's query. This ensembling approach may utilize a weighting scheme, where weights are assigned to each ranking component and represent the accuracy of each ranking component and the influence each ranking component exerts over the final result which is to be shown to the user. The various components in the ensemble may be initialized with default weights, which may be tweaked depending on the desired degree of exploration risk. However, these weights may be automatically updated based on periodic measurements and any measure of ranking component quality that can be derived from the implicit feedback collected from live interactions between users and the IR system. As a result, over time, the weights may be tuned to prefer ranker components which yield rankings that are in line with actual and current user needs. At all stages, weights may be calculated in an unsupervised manner to reflect the current level of utility provided by each ranker based on data collected from a fixed number of historical user sessions (e.g. the interactions logged over the course of the past week). Some options for calculating the weight of a ranker component may include using a combination of: moving average click-through rates, which are measured on interleaved ranker results and capture overall preference for each ranking component relative to the others; iterative exploration of the weight space, to collect click through rates with various scoring combinations, where the collected data points could be used to iteratively train optimal weights; and query performance metrics, which are derived from the particular ranking component's top K retrieval results, and which capture query level preference for this ranking component. The strategies used at each stage may evolve as more data becomes available through usage.

In one embodiment, the continuously optimized ranking program 110A, 110B may incorporate any ensembling mechanism which utilizes weights, which could be used to fuse the orderings produced by each ranking component. One option would be to use a weighted average of normalized scores produced by each ranking component using the following function:

$$s_i = \frac{1}{|C|} \sum_{c \in |C|} w_c s_{ci}$$

Here, Si may be the score awarded to document i by the ensemble (a descending order sort on this score will yield the final display order). C may be the set of all ranking components, wc may be the weight assigned to ranking component c, and sci may be the score assigned to document i by ranking component c. An alternate embodiment may involve continuously optimized ranking program 110A, 110B ensembling using a cascaded network structure where the weights may be used as gating features. In some embodiments, ranker components below a certain threshold weight may be pruned entirely to avoid wasting resources on a component that does not provide utility in the final ranking order. However, where a randomized ranker component is maintained throughout the life cycle in order to detect ranker deterioration and sub-optimal exploitation versus exploration trade-offs, the randomized ranker's weight may be prevented from dropping below a certain threshold by continuously optimized ranking program 110A, 110B.

Next, at 204, the continuously optimized ranking program 110A, 110B collects feedback from information retrieval with system default ranking components. Once some number of ranking components are in place, the IR system 108 is ready for use and continuously optimized ranking program 110A, 110B may begin to collect use-case-specific data such as query and click logs from live usage, along with initial click-through metrics, using, for example, an interleaving mechanism. In an alternate embodiment, continuously optimized ranking program 110A, 110B may receive use data, such as initial click-through metrics, query and click logs from IR system 108 or another entity in communication with continuously optimized ranking program 110A, 110B.

Then, at 206, the continuously optimized ranking program 110A, 110B updates with semi-supervised approaches. The semi-supervised approaches may be ranking components that make use of mostly unlabeled data for training, as well as a small amount of labeled data. At this stage, the IR system 108 may have collected some amount of query logs and click logs with which to begin making semi-supervised ranking components. These components may include: rankers trained on pre-labelled (non-use-case specific) data chosen based on feature vector similarity; rankers trained using queries from query logs; and rankers trained using queries and clicks from logs. Typically, rankers trained on pre-labelled (non-use-case specific) data chosen based on feature vector similarity leverage training data from other domains in conjunction with a sample selection bias correction technique to customize the data set for this domain. However, the continuously optimized ranking program 110A, 110B may make use of feature vector distributions to better match pre-labelled examples with the types of query-document pairs seen in this use case. The ranking component trained using queries from query logs may be trained using logged queries, date, and pseudo-relevance feedback similar to learning-to-rank training and testing. The ranker trained using queries and clicks from logs may use pseudo-labels derived from clicks using a variety of rules focused on reducing noisy labels. Additionally, in this step, continuously optimized ranking program 110A, 110B may prompt the system admin/manager/domain expert with explicit labelling tasks based on the queries logged during production usage of the system. The results from the rankers may be ensembled together by an ensembling program as in step 202 before being presented to the user.

Next, at 208, the continuously optimized ranking program 110A, 110B collects feedback from information retrieval with semi-supervised approaches. At this stage, the IR system 108 has collected a large amount of query and click logs from information retrieval conducted using the semi-supervised approaches. Optimized ranking program 110A, 110B may collect this feedback data from IR system 108. Unlabeled (or implicit) data collected in this step may be used to further improve the semi-supervised approaches of the previous step. Furthermore, continuously optimized ranking program 110A, 110B may prompt the system admin, manager, or domain expert with explicit labelling tasks based on the queries logged during production usage of the system, such that among the feedback collected in this step is some (smaller) set of explicitly labelled examples. The explicit data collected in this step may be used in the following step to enable supervised approaches, or to improve the semi-supervised approaches of the previous step.

Then, at 210, the continuously optimized ranking program 110A, 110B updates with supervised approaches. Supervised approaches may comprise ranking components which make use primarily of explicitly labeled training data, which typically makes them more accurate than the ranking components of previous steps. The continuously optimized ranking program 110A, 110B may utilize such ranking components as: rankers trained on explicit feedback on use-case specific data, where the ranking component a traditional learning-to-rank algorithm trained on explicit labels received on queries prioritized from the query logs; and rankers trained on queries and clicks with bias correction, where the presence of explicit labels on queries where clicks were observed may also provide the opportunities to model the click biases that exist in the usage behavior. These biases may be incorporated to adjust the clicks in the training data prior to training a ranker. At this point, the IR system 108 is likely behaving at high levels of retrieval accuracy (at least for the domain and use case in question). However, the continuously optimized ranking program 110A, 110B may use the 'weights' calculated on an ongoing basis to objectively test the accuracy. Ideally, the weight associated with the supervised rankers would continue to grow as the supervised rankers become more useful than the rankers trained on simpler assumptions. If this is not the case, or if usage patterns shift causing drops in the weights attributed to the supervised rankers, the rankers in this step may be re-trained with additional (and more recent) data collected by the system. As in steps 202 and 206, the results of each query for each ranking component are ensembled together according to their weights in order to create a list of search results for presentation to the user.

Next, at 212, the continuously optimized ranking program 110A, 110B collects feedback from information retrieval with supervised approaches. In this step, continuously optimized ranking program 110A, 110B may continue to collect query and click logs from IR system 108 and to solicit explicitly labelled feedback from experts and admins as in step 208. Both explicit and implicit feedback may be utilized to improve the accuracy of the ranking results. Explicit feedback may be a particular focus of this step, as it can be utilized to improve the accuracy of the supervised approaches, which are likely to be more accurate than the semi-supervised and default approaches.

Then, at 214, the continuously optimized ranking program 110A, 110B determines whether a termination condition has been met. According to one implementation, a termination condition may be supplied to continuously optimized ranking program 110A, 110B by user input; a termination condition may include optimized ranking program 110A, 110B running for a user-specified duration, or processing a user-specified number of queries. In an alternate embodiment, the termination condition may be any internal or external event that causes elements of computing environment 110 to be shut down or terminated, including shutdown of server 102 or client computing device 112, termination of some or all information retrieval programs 108, or shutdown of network 114. If the termination condition is met, optimized ranking program 110A, 110B may terminate (step 204, "YES" branch). If the continuously optimized ranking program 110A, 110B determines that the termination condition is not met (step 204, "NO" branch), the continuously optimized ranking program 110A, 110B may continue executing method 200 by moving to step 206 to update with semi-supervised approaches in order to re-train the semi-supervised approaches with additional and more recent data collected by the system and by optimized ranking program 110A, 110B. In an alternate embodiment, optimized ranking program 110A, 110B may continue executing the method 200 by moving instead to step 210 to update the supervised approaches in order to re-train the supervised approaches with additional and more recent data collected by the system and by optimized ranking program 110A, 110B.

It may be appreciated that FIG. 2 provides only an illustration of one implementation and does not imply any limitations with regard to how different embodiments may be implemented. Many modifications to the depicted environments may be made based on design and implementation requirements. For example, in an alternate embodiment, the continuously optimized ranking program 110A, 110B may reside on the client computing device 112 to allow for click session data capture, while the IR system 108 and the database 116 may be hosted on a server 102.

Figure 3:
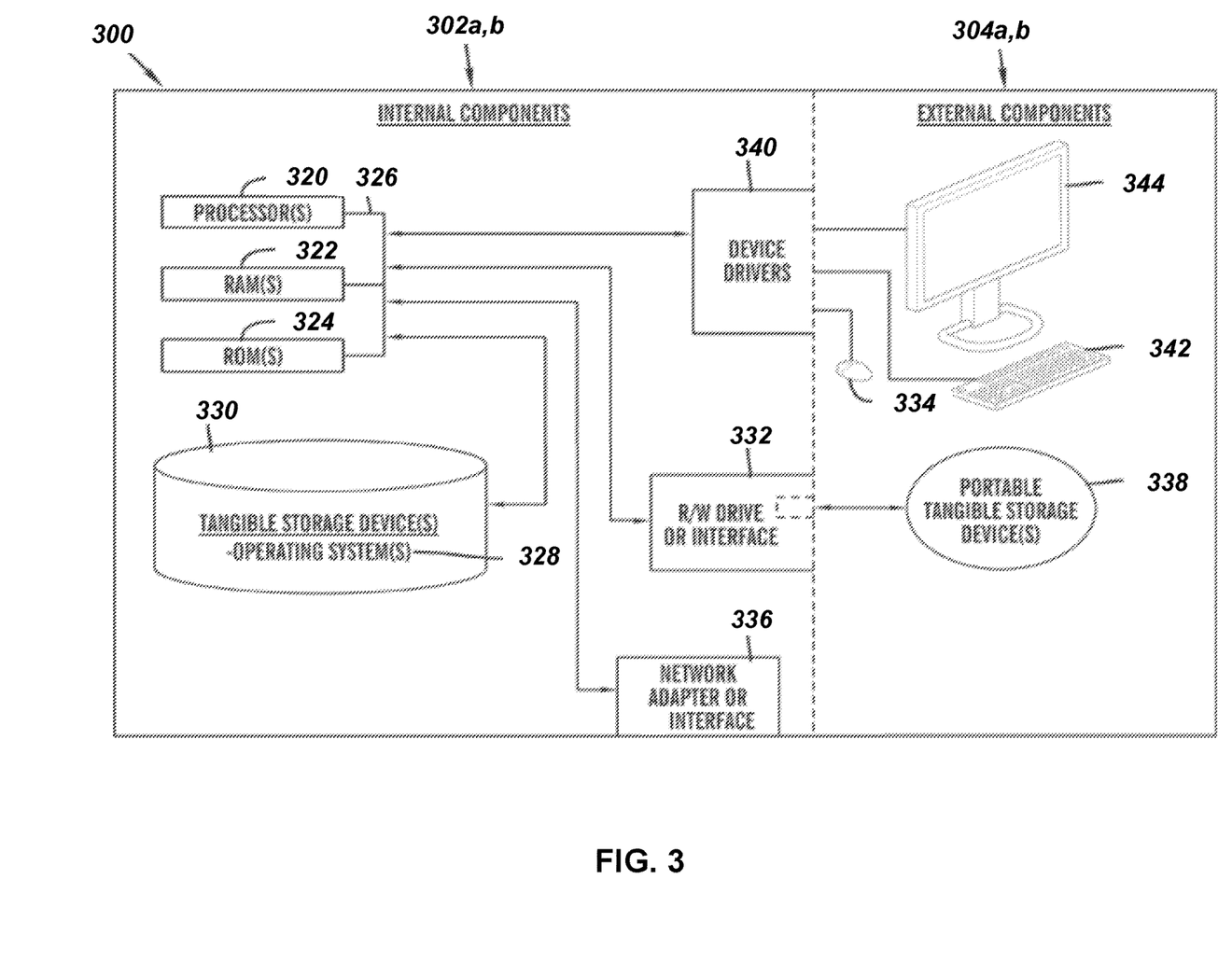
FIG. 3 is a block diagram of internal and external components of computers and servers depicted in FIG. 1 according to at least one embodiment.

FIG. 3 is a block diagram 300 of internal and external components of the client computing device 112 and the server 102 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 112 and the server 102 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the information retrieval system 108 and the continuously optimized ranking program 110A in the server 102, and the continuously optimized ranking program 110B in the client computing device 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the continuously optimized ranking program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The information retrieval system 108 and the continuously optimized ranking program 110A in the server 102 and the continuously optimized ranking program 110B in the client computing device 112 can be downloaded to the client computing device 112 and the server 102 from an external computer via a network (for example, the Internet, a local area network or other, wide area network) and respective network adapters or interfaces 336. From the network adapters or interfaces 336, the information retrieval system 108 and the continuously optimized ranking program 110A in the server 102 and the continuously optimized ranking program 110B in the client computing device 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
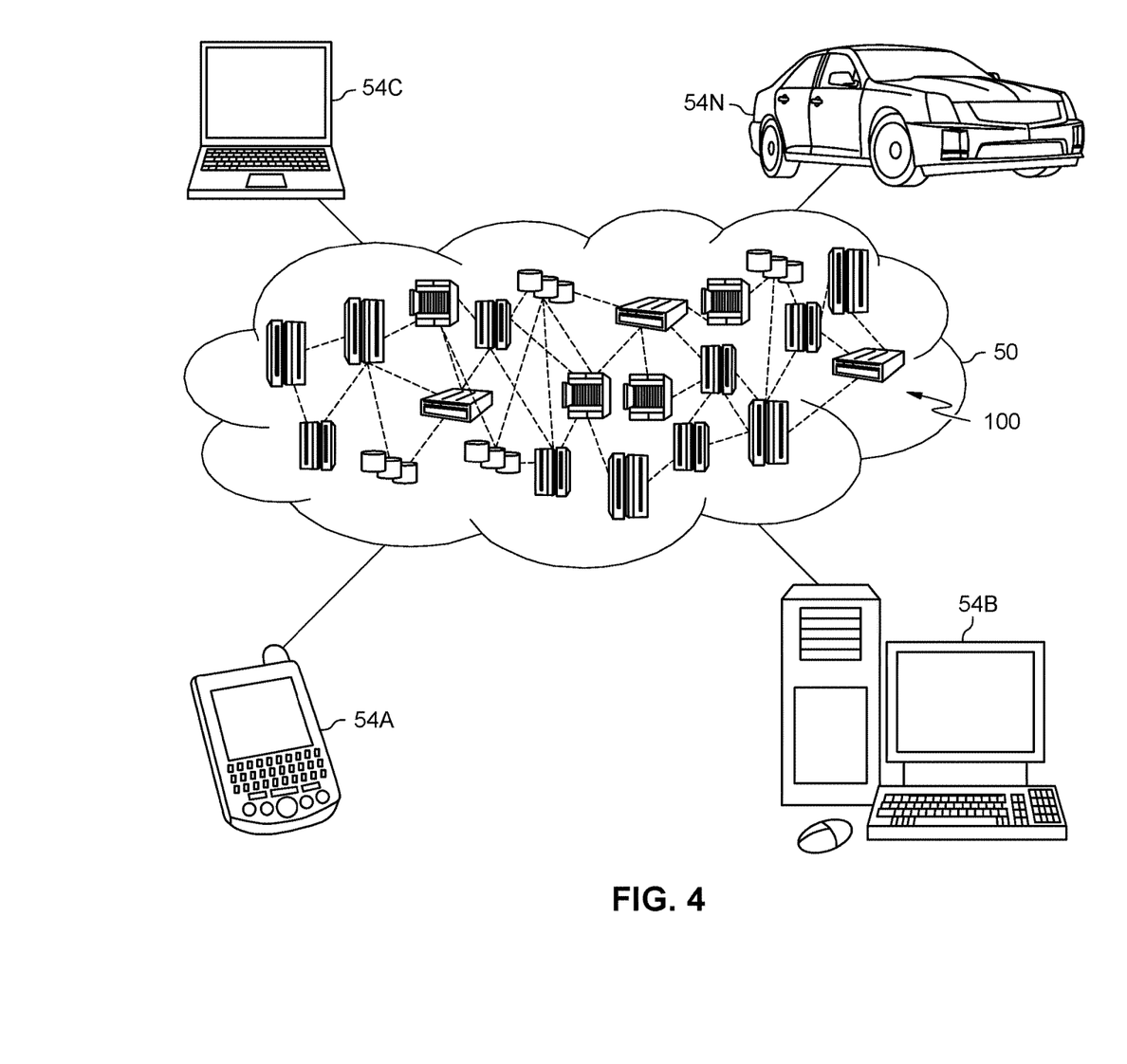
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
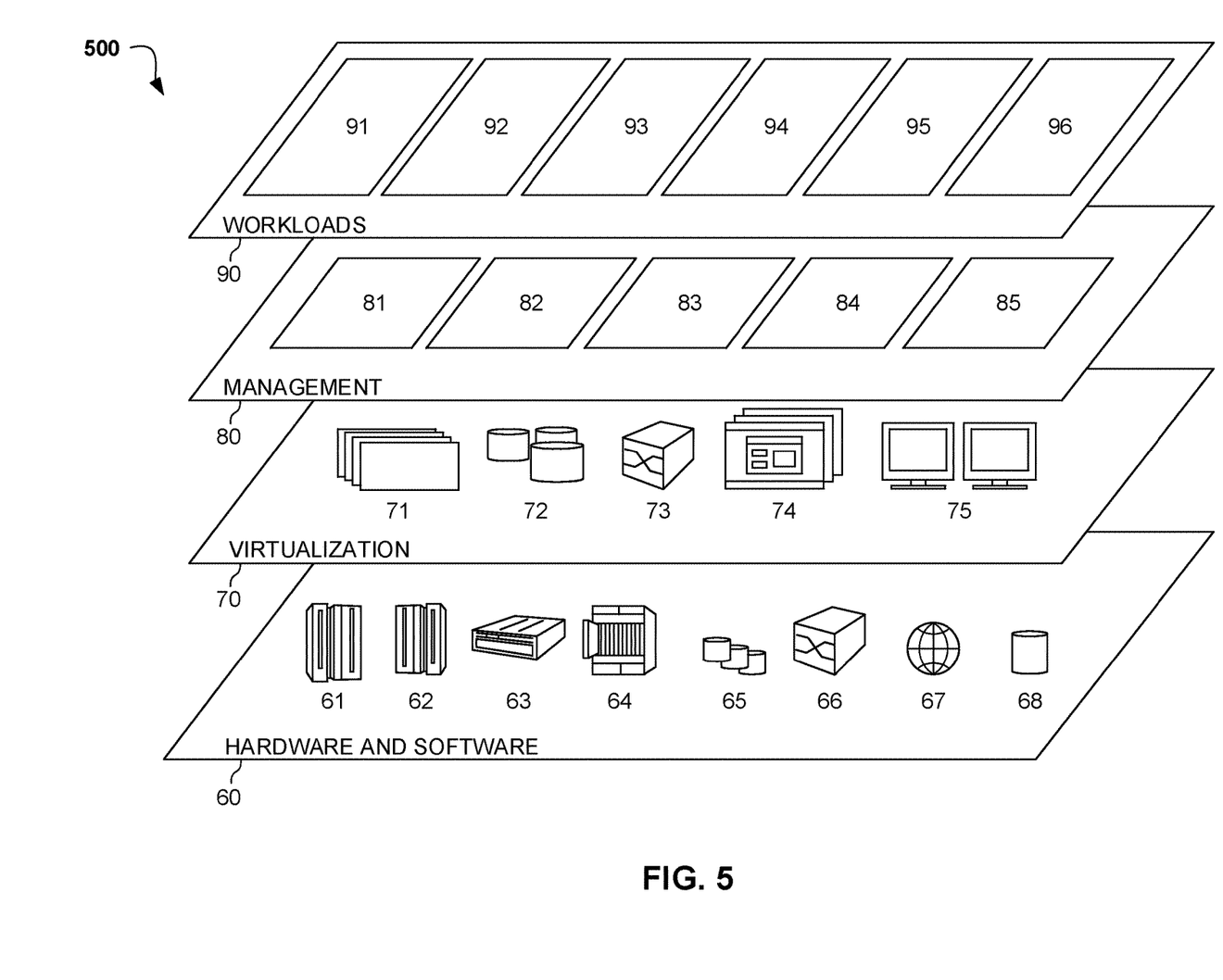
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and continuously optimized ranking 96. Continuously optimized ranking 96 may relate to ordering candidate answers in a live IR system through an ensemble of ranking components, both trainable and fixed, to provide a continuously optimized ranking for the IR system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for ranking one or more components in a live information retrieval system, the method comprising:
    implementing, within a ranking program, one or more ranking components to form a current set of ranking components;
    receiving a plurality of search feedback derived from one or more interactions between one or more users and one or more information retrieval systems;
    assigning one or more weights to each of the one or more ranking components;
    adjusting the one or more assigned weights based on a plurality of search feedback;
    modifying the current set of ranking components based on the plurality of search feedback by adding one or more new ranking components and deleting one or more old ranking components;
    transmitting a query from the one or more users to the current set of ranking components;
    aggregating one or more ranking results from the transmitted query into a single ranking based on the one or more weights; and
    transmitting the single ranking to the one or more users.

2. The method of claim 1, wherein at least one of the current set of ranking components is a randomized ranking component.

3. The method of claim 1, wherein the one or more old ranking components are deleted when the one or more weights associated with the one or more old ranking components fall below a threshold.

4. The method of claim 1, wherein the one or more added ranking components are selected when the plurality of search feedback comprises a plurality of non-use-case-specific data or no data, and wherein the one or more ranking components are selected from a group consisting of: a ranking component that relies on base information retrieval, a ranking component trained on a plurality of pre-labelled data chosen based on a document match, a randomized ranking component, and a ranking component trained on a plurality of expert-provided data for one or more related general use cases.

5. The method of claim 1, wherein the one or more added ranking components are selected when the search feedback comprises one or more query logs or one or more click logs, and wherein the one or more added ranking components are selected from a group consisting of: a ranking component trained on a plurality of pre-labelled data chosen based on a feature vector similarity, a ranking component trained using one or more queries from one or more query logs, and a ranking component trained using one or more queries and one or more clicks from one or more logs.

6. The method of claim 1, wherein the one or more added ranking components are selected when the search feedback comprises a plurality of explicit feedback, and wherein the one or more added ranking components are selected from a group consisting of: a ranking component trained using one or more queries and one or more clicks with a bias correction, and a ranking component trained on a plurality of explicit feedback on a plurality of use-case-specific data.

7. The method of claim 1, wherein the one or more ranking results are aggregated using an ensembling method that uses a weighted average of one or more normalized scores from the current set of ranking components.

* * * * *